US012470011B2

(12) United States Patent
Shan

(10) Patent No.: US 12,470,011 B2
(45) Date of Patent: Nov. 11, 2025

(54) WATERPROOF SOCKET

(71) Applicant: Ningbo Mengye Electric Appliance Co., LTD, Yuyao (CN)

(72) Inventor: Shenjiang Shan, Yuyao (CN)

(73) Assignee: Ningbo Mengye Electric Appliance Co., LTD, Yuyao (CN)

( * ) Notice: Subject to any disclaimer, the term of this patent is extended or adjusted under 35 U.S.C. 154(b) by 496 days.

(21) Appl. No.: 17/984,616

(22) Filed: Nov. 10, 2022

(65) Prior Publication Data

US 2024/0047916 A1 Feb. 8, 2024

(30) Foreign Application Priority Data

Aug. 4, 2022 (CN) ......................... 202222067891.5

(51) Int. Cl.
*H01R 13/52* (2006.01)
*H01R 13/512* (2006.01)

(52) U.S. Cl.
CPC ....... *H01R 13/5202* (2013.01); *H01R 13/512* (2013.01)

(58) Field of Classification Search
CPC .......................... H01R 13/5202; H01R 13/512
See application file for complete search history.

(56) References Cited

U.S. PATENT DOCUMENTS

| | | | | |
|---|---|---|---|---|
| 6,929,515 | B1 * | 8/2005 | Schneider | H01R 27/00 439/654 |
| 7,445,472 | B1 * | 11/2008 | Huang | H01R 13/4536 439/138 |
| 7,481,664 | B1 * | 1/2009 | Knoll | H01R 13/648 439/359 |
| 9,059,530 | B2 * | 6/2015 | Byrne | H01R 13/4534 |
| 9,478,921 | B2 * | 10/2016 | Osawa | H01R 13/42 |
| 9,601,841 | B2 * | 3/2017 | Strom | H01R 4/307 |
| 9,692,189 | B2 * | 6/2017 | Lin | H01R 13/713 |
| 9,761,985 | B1 * | 9/2017 | Peng | H01R 13/4534 |
| 10,594,071 | B2 * | 3/2020 | Kamemura | B60L 53/16 |
| 11,139,611 | B2 * | 10/2021 | Byrne | H01R 13/447 |
| 11,482,808 | B2 * | 10/2022 | Jagminas | H01R 13/5202 |
| 12,003,064 | B2 * | 6/2024 | Roh | B60R 16/04 |
| 12,003,092 | B2 * | 6/2024 | Cai | H01B 7/328 |
| 12,088,173 | B2 * | 9/2024 | Yamakage | H02K 11/33 |
| 12,095,199 | B2 * | 9/2024 | Jutz | H01R 43/0207 |
| 12,119,606 | B2 * | 10/2024 | Hirooka | H01R 13/748 |
| 12,142,878 | B2 * | 11/2024 | Otsuta | H01R 13/5205 |
| 12,176,694 | B2 * | 12/2024 | Barr | H01R 13/5825 |

* cited by examiner

*Primary Examiner* — Thanh Tam T Le
(74) *Attorney, Agent, or Firm* — JEEN IP LAW, LLC

(57) ABSTRACT

The present discloses a waterproof socket for solving the technical problems of poor design of waterproof structure and assembly structure design of related parts of existing similar products. The socket is sealed and fixed to a module hole in a socket shell, a connecting body and a protection film are arranged between the bottom bracket and the socket body, a through hole of the connecting body and a through hole of the protection film are aligned with the through hole of the socket body, and the bottom bracket is sealed and fixed to the socket body by the connecting body, a sealing ring is arranged at the connection between the connecting body and the socket body, and the bottom of the connecting body is arranged with long and short screw posts.

8 Claims, 6 Drawing Sheets

WATERPROOF SOCKET

CROSS-REFERENCE TO RELATED APPLICATIONS

This application claims priority to Chinese Patent Application No. 202222067891.5, filed on Aug. 4, 2022, the contents of which are herein incorporated by reference in their entireties.

TECHNICAL FIELD

The present disclosure relates to the technical field of socket, in particular to a waterproof socket.

BACKGROUND

Sockets are the medium used to connect electrical equipment and power wires in people's daily production and life. They are divided into fixed sockets and mobile sockets according to their different use states, and wall sockets, power strips, ground sockets, outdoor sockets, and outdoor sockets according to their different use environments. The socket is generally composed of a plastic casing, a circuit board, and a wire. The plug is inserted through the jack of the plastic casing, and is connected with the copper connector of the circuit board in the plastic casing. Some existing waterproof socket structures are arranged with a waterproof cover on one side of the socket, and a sealing sleeve is arranged at the socket inside or outside the shell; for example, a Chinese patent with application No. 201310064210.2, and publication date Jun. 12, 2013, application name is "waterproof structure of waterproof socket mating surface"; another example is a Chinese patent with application No. 201010558959.9, publication date Feb. 16, 2011, application name "a waterproof socket". However, the waterproof structure of the above products and similar products is not the strongest. For example, water splashing on the socket in daily life will cause short circuit and fire. At the same time, the above-mentioned safety problems also exist in the kitchen, laundry room, toilet and other places. Therefore, it is necessary to improve and enhance the internal waterproof structure, so that it can be better used in outdoor ground plugs, waterproof wall plugs and other use environments.

SUMMARY

In order to overcome the above-mentioned deficiencies, the purpose of this disclosure is to provide a waterproof socket in the art, so that it can solve the poor design of waterproof structure and assembly structure design of related parts of existing similar products, resulting in poor sealing, safety and waterproofness, especially the technical problems of lack of sealing ring on the outer surface and poor structural design of the inner insulating sleeve. The purpose is achieved through the following technical solutions.

A waterproof socket, the socket is sealed and fixed to a module hole in a socket shell, a socket body of the socket is arranged with a bottom through hole, and the bottom through hole of the socket body are respectively aligned with a spring clip groove at one end of the insert spring in the bottom bracket, and the symmetrically arranged terminals at the other end of the insert spring respectively protrude and are sealed and fixed to the bottom of the bottom bracket, and the bottom bracket is fixed to the bottom of the socket body by screws; wherein a connecting body and a protection film are arranged between the bottom bracket and the socket body, a through hole of the connecting body and a through hole of the protection film are aligned with the through hole of the socket body at the same time, and the bottom bracket is sealed and fixed to the socket body by the connecting body, a sealing ring is arranged at the connection between the connecting body and the socket body, and the bottom of the connecting body is arranged with two types of screw posts, long and short; that is, the connecting body is sealed and fixed to the bottom of the socket body by a first screw, the bottom bracket is sealed and fixed to the bottom of the connecting body by a second screw; the through holes of the connecting body at the spring clip groove of the insert spring between the connecting body and the bottom bracket are respectively arranged with insulating sleeves, and the protection film is arranged in the top groove of the connecting body, a waterproof ring is arranged on the outer plane of the top through hole of the socket body. The above-mentioned insulating sleeve is made of silicone material to play a safety sealing function. The copper insert of the plug is sealed and inserted into the through hole of the connector, the protection film and the insulating sleeve. The socket achieves the effect of three-level sealing and waterproofing. At the same time, the function of the above-mentioned waterproof ring is to fit the plastic parts on the end face of the plug when the plug is inserted, so as to prevent water from entering the plug surface and generate an arc between the electrodes, thereby causing short circuit and conduction.

The insulating sleeve comprises an class E insulating sleeve and a waterproof insulating sleeve, the socket body is arranged with three through holes, and the class E insulating sleeve is arranged in the through hole of the connecting body on the grounding side of the insert spring.

The waterproof insulating sleeve is respectively sealed and fixed to the through holes of the connecting body by the bottom of the connecting body, and the height of one side of the class E insulating sleeve is lower than the height of the other two waterproof insulating sleeves. the bottom of the class E insulating sleeve is higher than the bottom of the waterproof insulating sleeve, the through hole at the class E insulating sleeve of the connecting body protrudes downward, and the class E insulating sleeve is clamped and sealed between the connecting body and the bottom bracket by the second screw, the class E insulating sleeve is sealed and fixed to the through hole of the connecting body by the bottom of the connecting body.

The through holes of the waterproof insulating sleeve are closed and cut to fit each other, and the waterproof insulating sleeve is integrally formed by secondary processing and slotting. The above structure is beneficial to the insertion of the output of the plug without any obstruction, and can prevent water from entering and causing a conductive short circuit. The through hole at the connecting body on the side of the class E insulating sleeve is rectangular, and an opening is arranged on the class E insulating sleeve side of the protection film and is T-shaped, the opening on the class E insulating sleeve side of the protection film protrudes downward and is fastened in the through hole of the connecting body. Thus, it is convenient for the protection film to be installed and fixed in the top groove of the connecting body. One side edge of the protection film is arranged with an open screw groove, the fixed end of the buckle of the protection film protrudes downward and is rectangular, the opening of the protection film is arranged with an inclined surface in the top slot, and the bottom of the inclined surface is arranged with an inclined surface, the symmetrically arranged triangular rib is arranged with a convex fixing column, and the fixing column of the protection film is snap-fastened to the inner hole of the through hole of the connecting body. One side of the socket body protrudes in a T-shape, therefore, it is convenient for the socket to further seal and fix the module hole arranged in the socket housing, thereby improving its stability and firmness.

One side of the socket shell is arranged with a waterproof cover, one end of the waterproof cover is hingedly fixed to the socket shell, and the symmetrical other side of the waterproof cover is arranged with an open edge hole. Therefore, the waterproof socket with the above structure is further suitable for home use. According to the above structural features, a ground plug can also be provided on one side of the socket housing, so that the socket can be applied to ground plug socket products.

The disclosure has reasonable structural design, convenient production and assembly, wide application range, good sealing, safety and waterproofness; it is suitable for use as a waterproof socket in kitchens, laundry rooms, toilets and other places, especially suitable for outdoor waterproof sockets use, and structural improvements of its similar products.

Serial number and name: 1. Bottom bracket, 2. Insert spring, 3. First screw, 4. Class E insulating sleeve, 5. Waterproof insulating sleeve, 6. Connecting body, 7. Protection film, 8. Sealing ring, 9. Socket body, 10. Waterproof ring, 11. Second screw. 14. bottom through hole, 15. spring clip groove, 16. terminal, 18. top through hole, 19. buckle, 20. top slot, 21 triangular rib.

DETAILED DESCRIPTION

Figure 1:
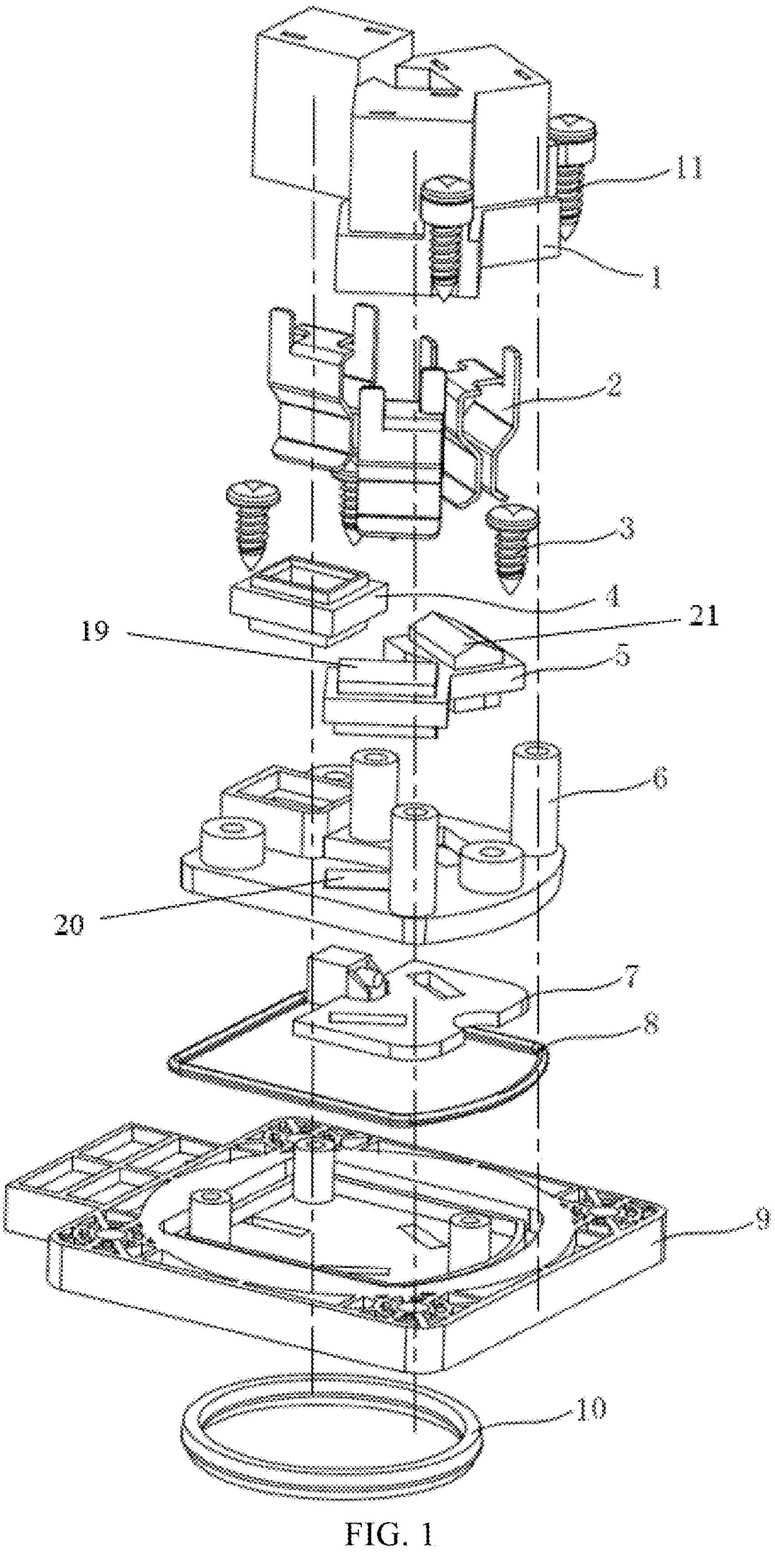
FIG. 1 is a schematic diagram of the explosion structure of the present disclosure.
Figure 2:
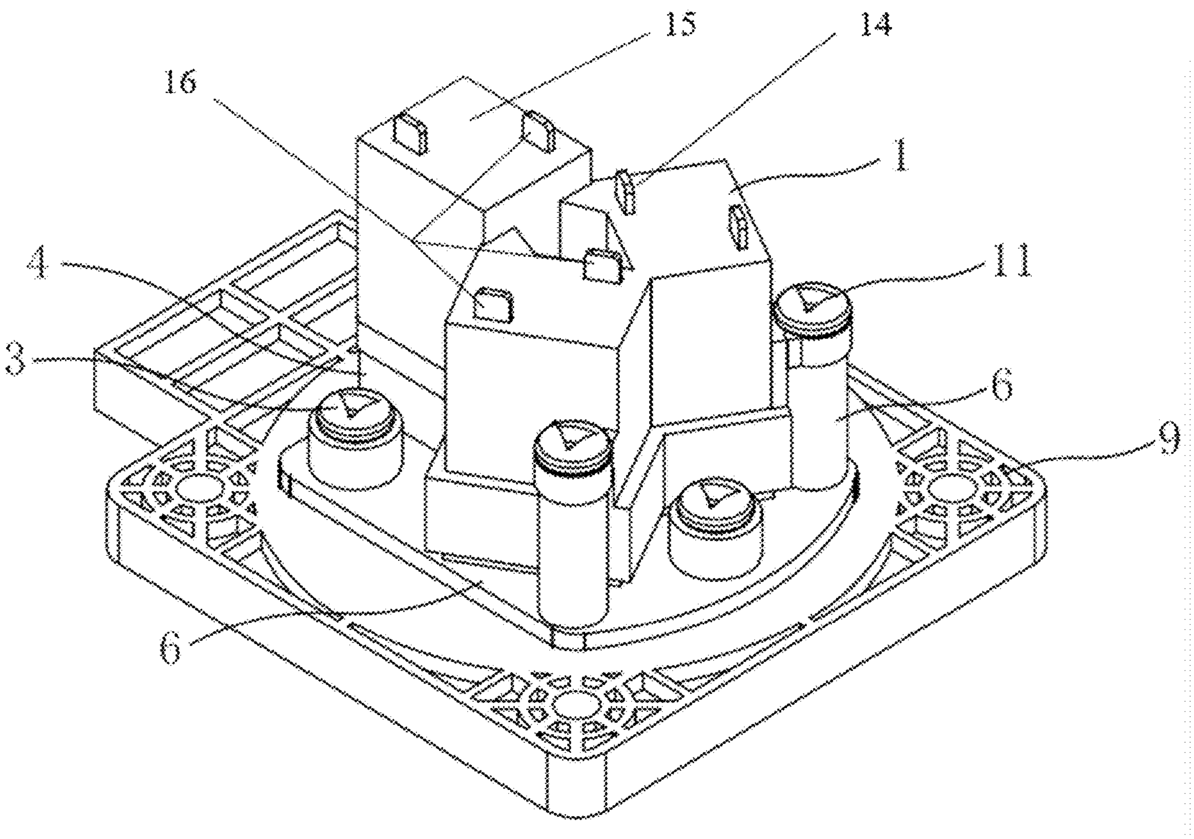
FIG. 2 is a schematic diagram of the bottom structure in the assembled state of FIG. 1.
Figure 3:
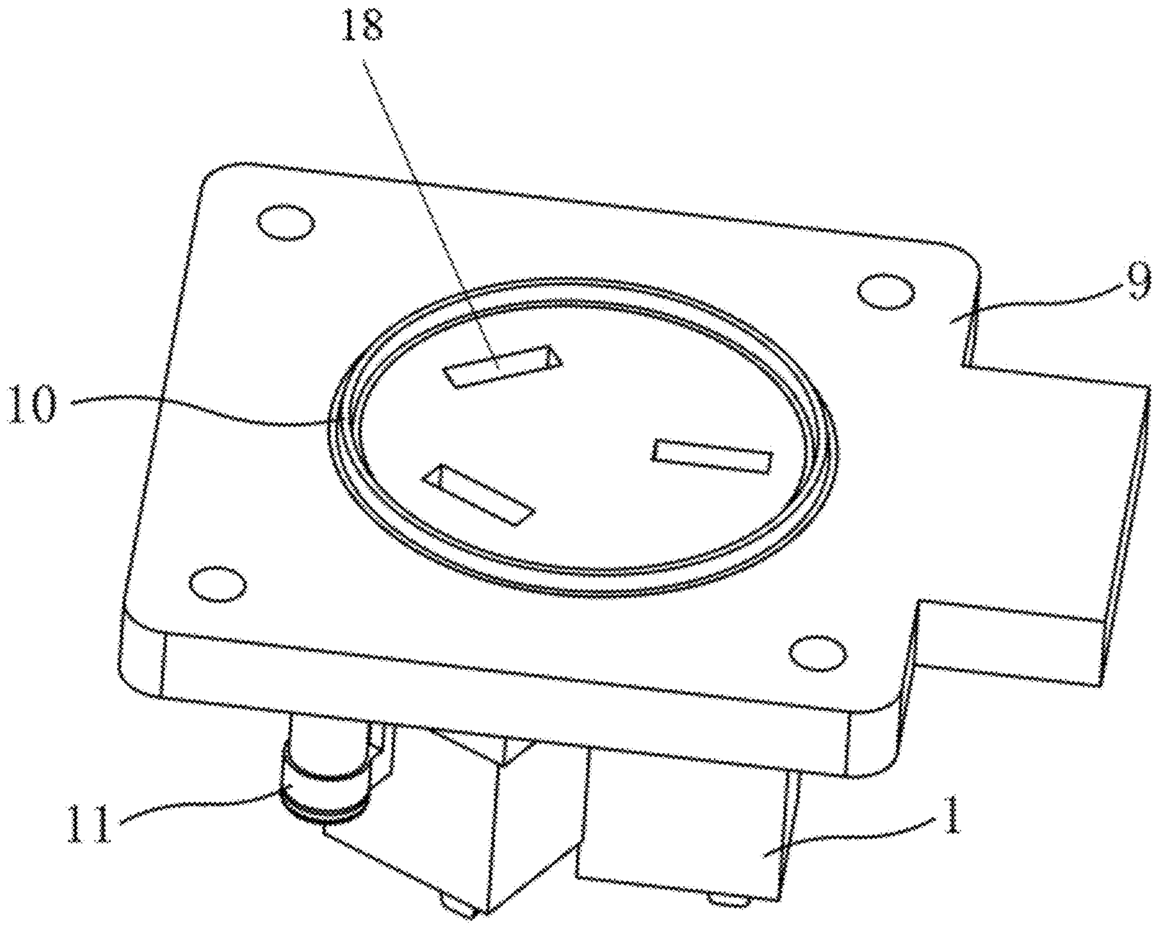
FIG. 3 is a schematic diagram of the top three-dimensional structure of FIG. 2.
Figure 4:
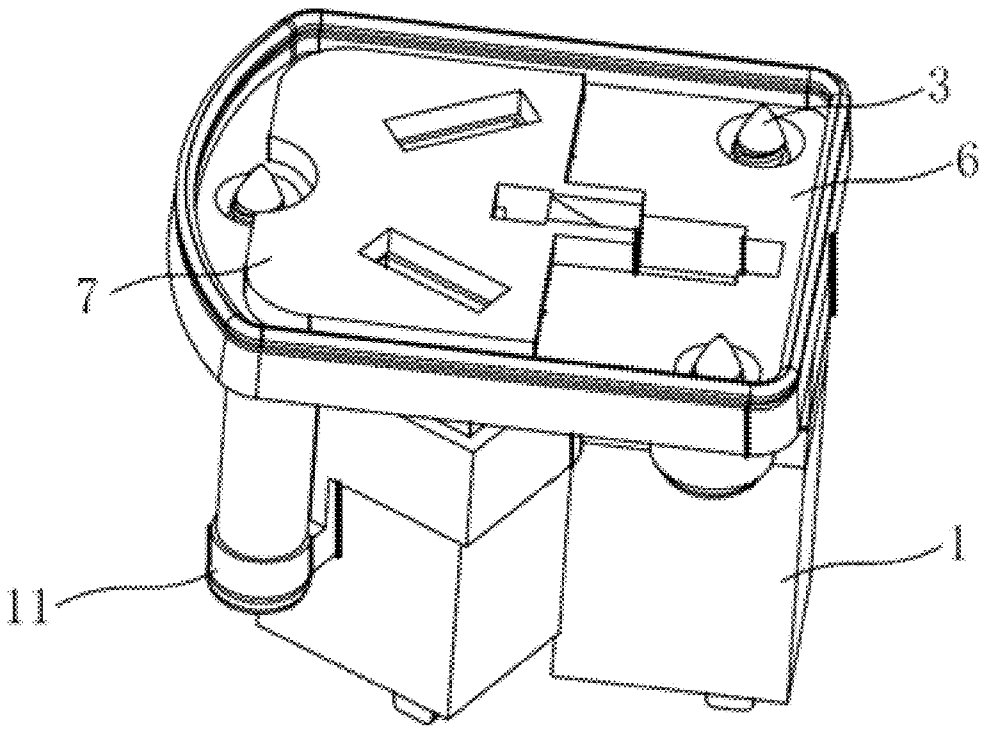
FIG. 4 is a schematic diagram of the internal structure below the socket body of FIG. 3, and the socket body is omitted in the figure.
Figure 5:
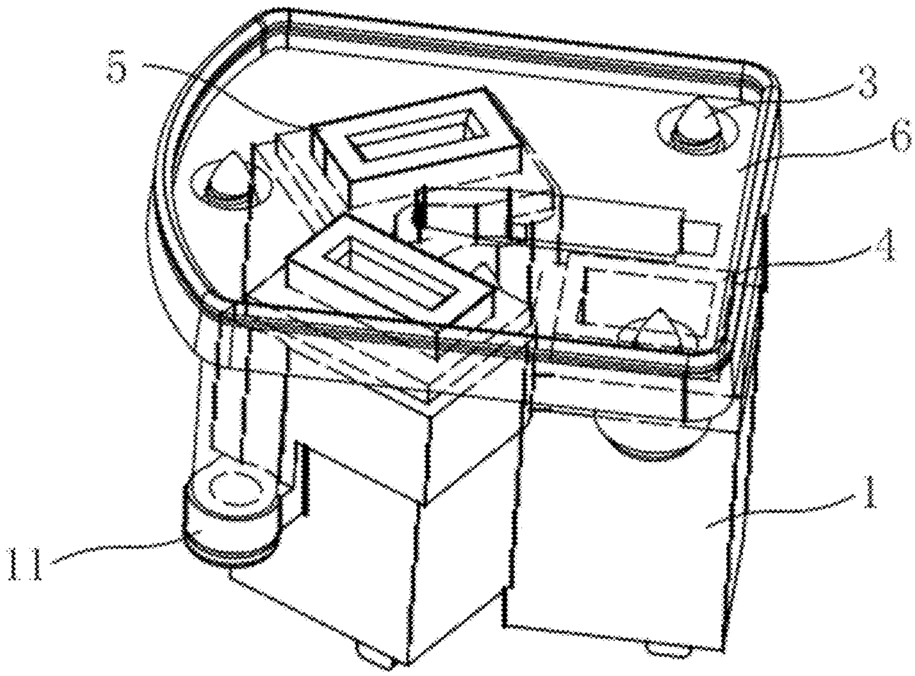
FIG. 5 is a schematic diagram of the internal structure below the protection film in FIG. 4, the protection film is further omitted in the figure, and the dotted line is part of the internal structure.
Figure 6:
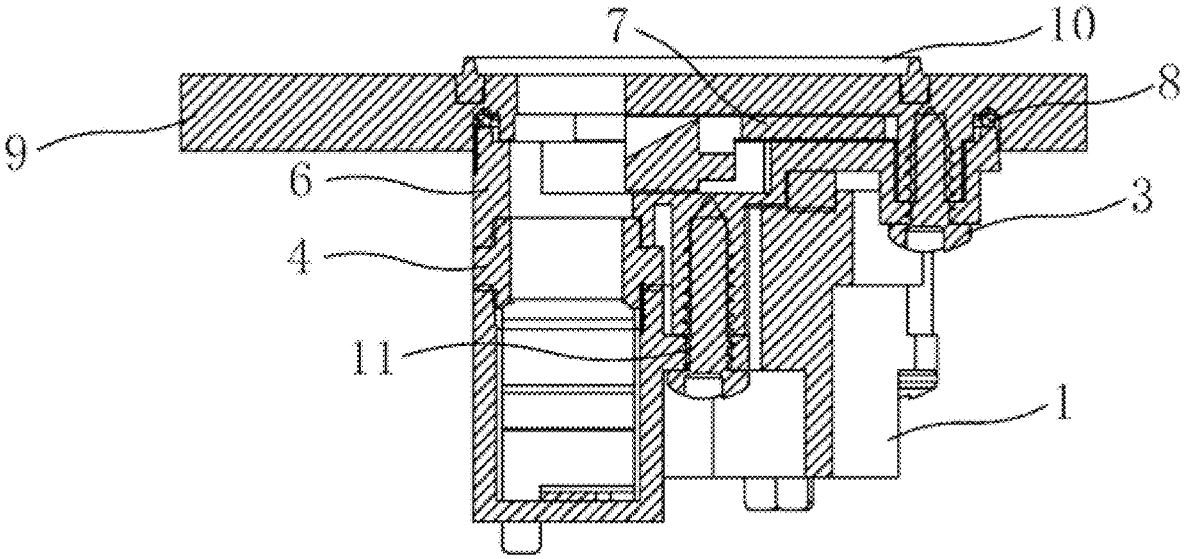
FIG. 6 is a schematic cross-sectional structure diagram of FIG. 3.

Now in conjunction with the accompanying drawings, the structure of the present disclosure will be further described. As shown in FIGS. 1-6, taking the three-socket structure as an example, the socket is used as a module component in various socket products, and is sealed and fixed in the module hole in the socket shell. The socket body 9 is arranged with three through holes, and one side of the socket body protrudes in a T-shape, a bottom through hole 14 of the socket body is aligned with a spring clip groove 15 at one end of the insert spring 2 in the bottom bracket 1, and symmetrically arranged terminals 16 at another end of the insert spring 2 are respectively protruded and sealed on the bottom bracket 1. The bottom bracket 1 is fixed to the bottom of the socket body 9 by screws. Its specific structure is as follows: a connecting body 6 and a protection film 7 are arranged between the bottom bracket 1 and the socket body 9, the through hole of the connecting body 6 and the through hole of the protection film 7 are aligned with the through hole of the socket body 9 at the same time, and the bottom bracket 1 is sealed to the socket body 9 by the connecting body 6, a sealing ring 8 is arranged at the connection between the connecting body 6 and the socket body 9, and the bottom of the connecting 6 body is arranged with long and short screw posts; that is, the connecting body 6 is sealed and fixed to the bottom of the socket body by a first screw 3, and the bottom bracket is sealed and fixed to the bottom of the connecting body by the second screw 11. The through holes of the connecting body are respectively arranged with insulating sleeves at the spring clip groove 15 where the spring is inserted between the connecting body and the bottom bracket, the protection film is arranged in the top groove of the connector body, and the outer surface of a top through hole 18 of the socket body is arranged with a waterproof ring 10.

The above-mentioned insulating sleeves comprises an Class E insulating sleeve 4 and a waterproof insulating sleeve 5. The Class E insulating sleeve is arranged in the through hole of the connecting body at the insertion spring on the ground side; the waterproof insulating sleeve is sealed and fixed to the through hole of the connecting body by the bottom of the connecting body respectively, the height of one side of the Class E insulating sleeve is lower than the height of the other two waterproof insulating sleeves. At the same time, the bottom of the Class E insulating sleeve of the bottom bracket is higher than the bottom of the waterproof insulating sleeve. The through hole at the Class E insulating sleeve of the connector protrudes downwards, and the Class E insulating sleeve is clamped and sealed between the connecting body and the bottom bracket by the second screw. At the same time, the Class E insulating sleeve is sealed and fixed to the through hole of the connecting body through the bottom of the connecting body; The through hole of the waterproof insulating sleeve is closed and cut to fit each other. The waterproof insulating sleeve is integrally formed through secondary processing and slotting. The through hole at the connecting body on one side of the Class E insulating sleeve is rectangular. The side of the Class E insulating sleeve of the protection film 7 has an opening and is T-shaped, the protection film protrudes downward and is snapped and fixed in the through hole of the connecting body. One side edge of the protection film is arranged with an open screw groove, a fixed end of a buckle 19 of the protection film protrudes downward into a rectangular shape, the opening of the protection film is arranged with an inclined surface in a top slot 20, triangular ribs 21 symmetrically arranged at a bottom of the inclined plane are provided with raised fixed columns, and a fixing column of the protection film is snap-fastened to an inner hole of the through hole of the connecting body.

When in use, according to the specific structure of various socket products, the sockets are respectively arranged with sealing pipes arranged on the shell of the isolated socket products corresponding to the T-shaped holes. The socket can be connected to the mains through the plug. According to the above structural features, a hingedly fixed waterproof cover can also be arranged on one side of the shell of the isolated socket product, and the waterproof cover can be used for further waterproofing.

What is claimed is:

1. A waterproof socket, the socket is sealed and fixed to a module hole in a socket shell, a socket body of the socket is arranged with a bottom through hole, and the bottom through hole of the socket body is aligned with a spring clip groove at one end of an insert spring in a bottom bracket, and terminals at another end of the insert spring respectively protrude and are sealed and fixed to a bottom of the bottom bracket, and the bottom bracket is fixed to a bottom of the socket body by screws;

wherein a connecting body and a protection film are arranged between the bottom bracket and the socket body, a first through hole of the connecting body and a second through hole of the protection film are aligned with the top through hole of the socket body at the same time, and the bottom bracket is sealed and fixed to the socket body by the connecting body, a sealing ring is arranged at a connection between the connecting body and the socket body, and a bottom of the connecting body is arranged with two types of screw posts, long and short; that is, the connecting body is sealed and fixed to the bottom of the socket body by a first screw, the bottom bracket is sealed and fixed to the bottom of the connecting body by a second screw; the first through hole of the connecting body at the spring clip groove of the insert spring between the connecting body and the bottom bracket is arranged with insulating sleeves, and the protection film is arranged in a top groove of the connecting body, a waterproof ring is arranged on an outer plane of a top through hole of the socket body.

2. The waterproof socket according to claim 1, wherein each of the insulating sleeves comprises an class E insulating sleeve and a waterproof insulating sleeve, the socket body is arranged with three through holes, and the class E insulating sleeve is arranged in the first through hole of the connecting body on a grounding side of the insert spring.

3. The waterproof socket according to claim 2, wherein the waterproof insulating sleeve is respectively sealed and fixed to the first through hole of the connecting body by the bottom of the connecting body, and a height of one side of the class E insulating sleeve is lower than a height of the waterproof insulating sleeve;

a bottom of the class E insulating sleeve is higher than a bottom of the waterproof insulating sleeve, the first through hole of the connecting body protrudes downward, and the class E insulating sleeve is clamped and sealed between the connecting body and the bottom bracket by the second screw, the class E insulating sleeve is sealed and fixed to the first through hole of the connecting body by the bottom of the connecting body.

4. The waterproof socket according to claim 2, wherein the waterproof insulating sleeve is integrally formed by secondary processing and slotting.

5. The waterproof socket according to claim 2, wherein the first through hole of the connecting body is rectangular, and an opening is arranged on the protection film and, the opening is T-shaped, the opening on the protection film protrudes downward and is fastened in the first through hole of the connecting body.

6. The waterproof socket according to claim 5, wherein one side edge of the protection film is arranged with an open screw groove, a fixed end of a buckle of the protection film protrudes downward and is rectangular, the opening of the protection film is arranged with an inclined surface in a top slot, a triangular rib is arranged with a convex fixing column, and a fixing column of the protection film is snap-fastened to an inner hole of the first through hole of the connecting body.

7. The waterproof socket according to claim 1, wherein one side of the socket body is protruded.

8. The waterproof socket according to claim 1, wherein one side of the socket shell is arranged with a waterproof cover, one end of the waterproof cover is hingedly fixed to the socket shell, and the other side of the waterproof cover is arranged with an open edge hole.

* * * * *